United States Patent
Rao Krishnagi et al.

(10) Patent No.: US 12,254,122 B2
(45) Date of Patent: Mar. 18, 2025

(54) SYSTEM AND METHOD FOR PASSWORD-LESS AUTHENTICATION THROUGH DIGITAL DRIVING LICENSE

(71) Applicant: JPMorgan Chase Bank, N.A., New York, NY (US)

(72) Inventors: Kumar Rao Krishnagi, Powell, OH (US); Stefan Schubert, Columbus, OH (US); Suresh Madhavan, Edison, NJ (US); Sandeep Reddy Banala, Monroe, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 300 days.

(21) Appl. No.: 17/655,418

(22) Filed: Mar. 18, 2022

(65) Prior Publication Data

US 2023/0297723 A1    Sep. 21, 2023

(51) Int. Cl.
| | | |
|---|---|---|
| G06F 21/71 | (2013.01) | |
| G06F 21/31 | (2013.01) | |
| G06F 21/60 | (2013.01) | |
| G06Q 20/40 | (2012.01) | |
| H04L 67/133 | (2022.01) | |

(52) U.S. Cl.
CPC ............. *G06F 21/71* (2013.01); *G06F 21/31* (2013.01); *G06F 21/602* (2013.01); *G06Q 20/401* (2013.01); *H04L 67/133* (2022.05)

(58) Field of Classification Search
CPC ........ G06F 21/71; G06F 21/31; G06F 21/602; H04L 67/133; G06Q 20/401
See application file for complete search history.

(56) References Cited

U.S. PATENT DOCUMENTS

| | | | |
|---|---|---|---|
| 6,263,447 B1 * | 7/2001 | French | G06F 21/33 726/5 |
| 6,282,658 B2 * | 8/2001 | French | G06F 21/40 713/182 |
| 9,721,147 B1 * | 8/2017 | Kapczynski | G06Q 50/265 |
| 9,992,170 B2 * | 6/2018 | O'Hare | G06F 21/6218 |
| 2004/0059923 A1 * | 3/2004 | ShamRao | G06F 21/34 713/186 |
| 2009/0132813 A1 * | 5/2009 | Schibuk | G06Q 20/4014 726/9 |

(Continued)

*Primary Examiner* — Olugbenga O Idowu
(74) *Attorney, Agent, or Firm* — GREENBLUM & BERNSTEIN, P.L.C.

(57) ABSTRACT

Password-less authentication and login onto an application are disclosed. A processor extracts Digital Driver's License (DDL) data from a user's computing device; extracts the DDL data of the user from an external database (i.e., DMV); validates the DDL data by comparing with the DDL data from the external database; creates, in response to validating, a DDL secret private key; allows successful registration of the computing device to utilize DDL data for login; and stores the DDL secret private key onto an internal database and a secured environment of the computing device. At login request by the user, when the processor determines that the computing device is successfully registered, it validates the DDL secret private key by comparing with data from the internal database; creates a new DDL secret private key and updates the internal database and the secured environment with the new DDL secret private key for subsequent login.

17 Claims, 6 Drawing Sheets

(56) References Cited

U.S. PATENT DOCUMENTS

| | | | |
|---|---|---|---|
| 2009/0187435 A1* | 7/2009 | Carr | G07C 9/20 |
| | | | 235/382 |
| 2010/0229231 A1* | 9/2010 | Iwai | H04N 21/25875 |
| | | | 726/28 |
| 2011/0191248 A1* | 8/2011 | Bishop | G06Q 20/363 |
| | | | 705/67 |
| 2012/0303503 A1* | 11/2012 | Cambridge | H04W 12/35 |
| | | | 705/35 |
| 2013/0061055 A1* | 3/2013 | Schibuk | G06Q 20/40 |
| | | | 713/172 |
| 2013/0159732 A1* | 6/2013 | Leoutsarakos | H04L 9/085 |
| | | | 713/193 |
| 2013/0312073 A1* | 11/2013 | Srivastav | H04L 9/3215 |
| | | | 726/7 |
| 2014/0201100 A1* | 7/2014 | Rellas | G06Q 30/0607 |
| | | | 705/330 |
| 2014/0279516 A1* | 9/2014 | Rellas | G07D 7/206 |
| | | | 705/318 |
| 2015/0249540 A1* | 9/2015 | Khalil | H04L 63/18 |
| | | | 713/158 |
| 2016/0197918 A1* | 7/2016 | Turgeman | G06F 21/316 |
| | | | 726/4 |
| 2017/0004591 A1* | 1/2017 | Kaminski | H04L 63/083 |
| 2017/0317997 A1* | 11/2017 | Smith | H04L 9/14 |
| 2018/0025332 A1* | 1/2018 | Huang | G06Q 20/10 |
| | | | 705/71 |
| 2019/0080058 A1* | 3/2019 | Thomas | H04L 63/08 |
| 2020/0302043 A1* | 9/2020 | Vachon | G06F 21/36 |
| 2021/0194703 A1* | 6/2021 | Queralt | H04L 63/0815 |
| 2021/0240814 A1* | 8/2021 | Sholtis | G06F 21/45 |
| 2021/0249882 A1* | 8/2021 | Baldasare | H04M 1/72409 |
| 2021/0258304 A1* | 8/2021 | Cockerill | H04L 63/105 |
| 2021/0258308 A1* | 8/2021 | Avetisov | H04L 9/3215 |
| 2022/0014361 A1* | 1/2022 | Ahn | H04L 9/0869 |
| 2022/0036339 A1* | 2/2022 | Guo | G06Q 20/3821 |
| 2022/0141207 A1* | 5/2022 | Villax | G06F 21/6245 |
| | | | 726/4 |
| 2022/0150237 A1* | 5/2022 | Canfield | H04L 63/104 |
| 2022/0391512 A1* | 12/2022 | Sethi | G06F 21/575 |
| 2023/0030169 A1* | 2/2023 | Park | G06F 21/45 |
| 2023/0031087 A1* | 2/2023 | Tussy | H04W 12/06 |
| 2023/0281604 A1* | 9/2023 | Robell | G06Q 30/018 |
| 2023/0297723 A1* | 9/2023 | Rao Krishnagi | G06F 21/31 |
| | | | 726/26 |
| 2023/0300243 A1* | 9/2023 | Frendo | H04M 3/42042 |
| | | | 379/142.04 |
| 2023/0334128 A1* | 10/2023 | Norman | G06F 21/45 |
| 2023/0409681 A1* | 12/2023 | Swaminathan | G06F 21/31 |
| 2023/0412587 A1* | 12/2023 | Swaminathan | H04L 67/55 |

\* cited by examiner

SYSTEM AND METHOD FOR PASSWORD-LESS AUTHENTICATION THROUGH DIGITAL DRIVING LICENSE

TECHNICAL FIELD

This disclosure generally relates to authenticating users to access applications (i.e., mobile applications), and, more particularly, to methods and apparatuses for implementing a platform and language agnostic password-less authentication module configured to utilize digital driving license of a user, instead of using any user's password/passcode, to authenticate the user to access the application.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Transactions between a consumer (i.e., user, client) and a provider to conduct an online transaction may be subject to risks of identity theft, identity fraud, spoofing, phishing, snooping, etc., all of which may potentially hinder access to mobile applications. For example, passwords can be vulnerable to interception (i.e., hacking) when transmitted to an authentication machine or person. If the password is carried as an electrical signal over the insecure physical wiring between the user's access point and the central system that controls the password database, it is subject to hacking by a communication interception method. If it is carried over the Internet, a bad actor who can see a packet containing logon information may easily hack and is unlikely to be detected. Some organizations have noted a significant increase in stolen passwords since users began using Internet connections.

In addition, authentication is a verification step that essentially answers the question, "How can you demonstrate you are really who you say you are?" Typically mobile applications request a password, PIN code, or the like, ostensibly only known by the user and the mobile applications' supporting website. Today's advanced authentication methods may also utilize biometric data such as fingerprints, iris characteristics, or the like. Such systems often rely on the authentication information to be kept as a secret and being difficult to guess. Further, users are frequently told not to use the same password on multiple mobile applications. However, such requirements may prove to be difficult to enforce, and hence many people out of laziness tend to use the same easy-to-guess password on multiple mobile applications, rendering their information less secure on all such mobile applications.

Moreover, at least 10% to 15% of users of mobile applications enter invalid passwords on a daily basis further resulting in locking of password and restricting access to the mobile applications thereby hindering smooth transactions and adding users' frustrations.

Thus, there is a need for an advanced tool that can implement an improved authentication system that does not require any password or passcode from a user to login onto mobile applications.

SUMMARY

The present disclosure, through one or more of its various aspects, embodiments, and/or specific features or sub-components, provides, among other features, various systems, servers, devices, methods, media, programs, and platforms for implementing a platform and language agnostic password-less authentication module configured to utilize digital identification information (i.e., digital driving license) of a user, instead of using any user's password/passcode, to authenticate the user to access the application, but the disclosure is not limited thereto.

According to an aspect of the present disclosure, a method for password-less authentication and login onto an application by utilizing one or more processors and one or more memories is disclosed. The method may include: storing digital driver's license (DDL) information data of a user onto a computing device utilized by the user; receiving user input via selection of an icon among a plurality of icons displayed on a user interface of the computing device, wherein the selected icon indicates registration option of the computing device via an external database that also stores the DDL information data of the user; extracting, in response to receiving user input, the DDL information data from the computing device; calling an application programming interface (API) associated with external database to extract the DDL information data of the user from the external database; comparing the DDL information data of the user extracted from the computing device with the DDL information data of the user extracted from the external database; validating the DDL information data of the user extracted from the computing device when it is determined that the DDL information data of the user extracted from the computing device exactly matches the DDL information data of the user extracted from the external database; creating, in response to validating, a DDL secret private key; storing the DDL secret private key onto both an internal database and a secured environment within the computing device; transmitting an electronic notification to the application that the registration of the computing device is successful; and displaying the electronic notification indicating successful registration onto the user interface.

According to an additional aspect of the present disclosure, the method may further include: invalidating the DDL information data of the user extracted from the computing device when it is determined that the DDL information data of the user extracted from the computing device does not exactly match the DDL information data of the user extracted from the external database; transmitting an electronic notification to the application that the registration of the computing device is unsuccessful; and displaying the electronic notification indicating unsuccessful registration onto the user interface.

According to a further aspect of the present disclosure, the computing device may be a mobile device and the application may be a mobile application configured to support conducting online transaction, but the disclosure is not limited thereto. For example, the computing device may be a smart phone, a tablet, a notebook, personal digital assistant, a dedicated wallet device, a wearable computing device, or any other portable device capable of sending and receiving messages over a network. The client device may also be devices integrated into the Internet of Things, such as a smart home or devices within the home of the user, but the disclosure is not limited thereto.

According to a yet another aspect of the present disclosure, the mobile device may be an android device, and the method may further include: storing the DDL secret private key onto a trusted execution environment within the android device.

According to an aspect of the instant disclosure, the mobile device may be an iPhone, and the method may further include: storing the DDL secret private key onto a secure enclave within the iPhone.

According to a further aspect of the instant disclosure, the external database may be owned and operated by a third party vendor that utilizes external network that does not control operations of the application, but the disclosure is not limited thereto.

According to an additional aspect of the instant disclosure, the external database may be owned and operated by a department of motor vehicle (DMV) of a state where the user resides, but the disclosure is not limited thereto.

According to yet another aspect of the instant disclosure, the internal database may utilize internal network within an organization that controls operations of the application.

According to a further aspect of the instant disclosure, the method may further include: receiving a login request from the user, via the user interface, to login onto the application; and when it is determined that the registration of the computing device is successful based on the registration process disclosed above, the method may further automatically execute the following login process in response to the login request: extracting the DDL secret private key from the computing device of the user; extracting the DDL secret private key associated with the user from the internal database; validating the DDL secret private key extracted from the computing device when it is determined that the DDL secret private key extracted from the computing device exactly matches the DDL secret private key extracted from the internal database; and allowing login access to the application in response to validating the DDL secret private key.

According to aspect of the instant disclosure, the method may further include: creating a new DDL secret private key to be utilized for subsequent login request by the user; updating the internal database by replacing the DDL secret private key with the new DDL secret private key; replacing the DDL secret private key stored onto the secured environment of the computing device with the new DDL secret private key; and iterating the login process with the new DDL secret private key in response to receiving a subsequent request of login from the user.

According to a further aspect of the instant disclosure, the method may further include: invalidating the DDL secret private key when it is determined that the DDL secret private key extracted from the computing device does not exactly match the DDL secret private key extracted from the internal database; blocking login access to the application in response to invalidating the DDL secret private key; locking user's account associated with the application; transmitting an electronic notification to the application indicating that the user's account has been locked; and displaying the electronic notification indicating locked user's account onto the user interface.

According to another aspect of the instant disclosure, a system for password-less authentication and login onto an application is disclosed. The system may include: a processor; and a memory operatively connected to the processor via a communication interface, the memory storing computer readable instructions, when executed, may cause the processor to: store DDL information data of a user onto a computing device utilized by the user; receive user input via a selection of an icon among a plurality of icons displayed on a user interface of the computing device, wherein the selected icon indicates registration option of the computing device via an external database that also stores the DDL information data of the user; extract, in response to receiving user input, the DDL information data from the computing device; call an application programming interface (API) associated with external database to extract the DDL information data of the user from the external database; compare the DDL information data of the user extracted from the computing device with the DDL information data of the user extracted from the external database; validate the DDL information data of the user extracted from the computing device when it is determined that the DDL information data of the user extracted from the computing device exactly matches the DDL information data of the user extracted from the external database; create, in response to validating, a DDL secret private key; store the DDL secret private key onto both an internal database and a secured environment within the computing device; transmit an electronic notification to the application that the registration of the computing device is successful; and di splay the electronic notification indicating successful registration onto the user interface.

According to an aspect of the instant disclosure, the processor may be further configured to: invalidate the DDL information data of the user extracted from the computing device when it is determined that the DDL information data of the user extracted from the computing device does not exactly match the DDL information data of the user extracted from the external database; transmit an electronic notification to the application that the registration of the computing device is unsuccessful; and display the electronic notification indicating unsuccessful registration onto the user interface.

According to a further aspect of the instant disclosure, the processor may be further configured to: receive a login request from the user, via the user interface, to login onto the application; and when it is determined that the registration of the computing device is successful, automatically execute the following login process in response to the login request: extract the DDL secret private key from the computing device of the user; extract the DDL secret private key associated with the user from the internal database; validate the DDL secret private key extracted from the computing device when it is determined that the DDL secret private key extracted from the computing device exactly matches the DDL secret private key extracted from the internal database; and allow login access to the application in response to validating the DDL secret private key.

According to an additional aspect of the instant disclosure, the processor may be further configured to: create a new DDL secret private key to be utilized for subsequent login request by the user; update the internal database by replacing the DDL secret private key with the new DDL secret private key; replace the DDL secret private key stored onto the secured environment of the computing device with the new DDL secret private key; and iterate the login process with the new DDL secret private key in response to receiving a subsequent request of login from the user.

According to yet another aspect of the instant disclosure, the processor may be further configured to: invalidate the DDL secret private key when it is determined that the DDL secret private key extracted from the computing device does not exactly match the DDL secret private key extracted from the internal database; block login access to the application in response to invalidating the DDL secret private key; lock user's account associated with the application; transmit an electronic notification to the application indicating that the user's account has been locked; and display the electronic notification indicating locked user's account onto the user interface.

According to a further aspect of the present disclosure, a non-transitory computer readable medium configured to store instructions for a password-less authentication and login onto an application is disclosed. The instructions, when executed, may cause a processor to perform the following: storing digital driver's license (DDL) information data of a user onto a computing device utilized by the user; receiving user input via selection of an icon among a plurality of icons displayed on a user interface of the computing device, wherein the selected icon indicates registration option of the computing device via an external database that also stores the DDL information data of the user; extracting, in response to receiving user input, the DDL information data from the computing device; calling an application programming interface (API) associated with external database to extract the DDL information data of the user from the external database; comparing the DDL information data of the user extracted from the computing device with the DDL information data of the user extracted from the external database; validating the DDL information data of the user extracted from the computing device when it is determined that the DDL information data of the user extracted from the computing device exactly matches the DDL information data of the user extracted from the external database; creating, in response to validating, a DDL secret private key; storing the DDL secret private key onto both an internal database and a secured environment within the computing device; transmitting an electronic notification to the application that the registration of the computing device is successful; and di splaying the electronic notification indicating successful registration onto the user interface.

According to an additional aspect of the present disclosure, the instructions, when executed, may cause a processor to perform the following: invalidating the DDL information data of the user extracted from the computing device when it is determined that the DDL information data of the user extracted from the computing device does not exactly match the DDL information data of the user extracted from the external database; transmitting an electronic notification to the application that the registration of the computing device is unsuccessful; and di splaying the electronic notification indicating unsuccessful registration onto the user interface.

According to a further aspect of the present disclosure, the instructions, when executed, may cause a processor to perform the following: receiving a login request from the user, via the user interface, to login onto the application; and when it is determined that the registration of the computing device is successful based on the registration process disclosed above, the method may further automatically execute the following login process in response to the login request: extracting the DDL secret private key from the computing device of the user; extracting the DDL secret private key associated with the user from the internal database; validating the DDL secret private key extracted from the computing device when it is determined that the DDL secret private key extracted from the computing device exactly matches the DDL secret private key extracted from the internal database; and allowing login access to the application in response to validating the DDL secret private key.

According to aspect of the instant disclosure, the instructions, when executed, may cause a processor to perform the following: creating a new DDL secret private key to be utilized for subsequent login request by the user; updating the internal database by replacing the DDL secret private key with the new DDL secret private key; replacing the DDL secret private key stored onto the secured environment of the computing device with the new DDL secret private key; and iterating the login process with the new DDL secret private key in response to receiving a subsequent request of login from the user.

According to a further aspect of the instant disclosure, the instructions, when executed, may cause a processor to perform the following: invalidating the DDL secret private key when it is determined that the DDL secret private key extracted from the computing device does not exactly match the DDL secret private key extracted from the internal database; blocking login access to the application in response to invalidating the DDL secret private key; locking user's account associated with the application; transmitting an electronic notification to the application indicating that the user's account has been locked; and displaying the electronic notification indicating locked user's account onto the user interface.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
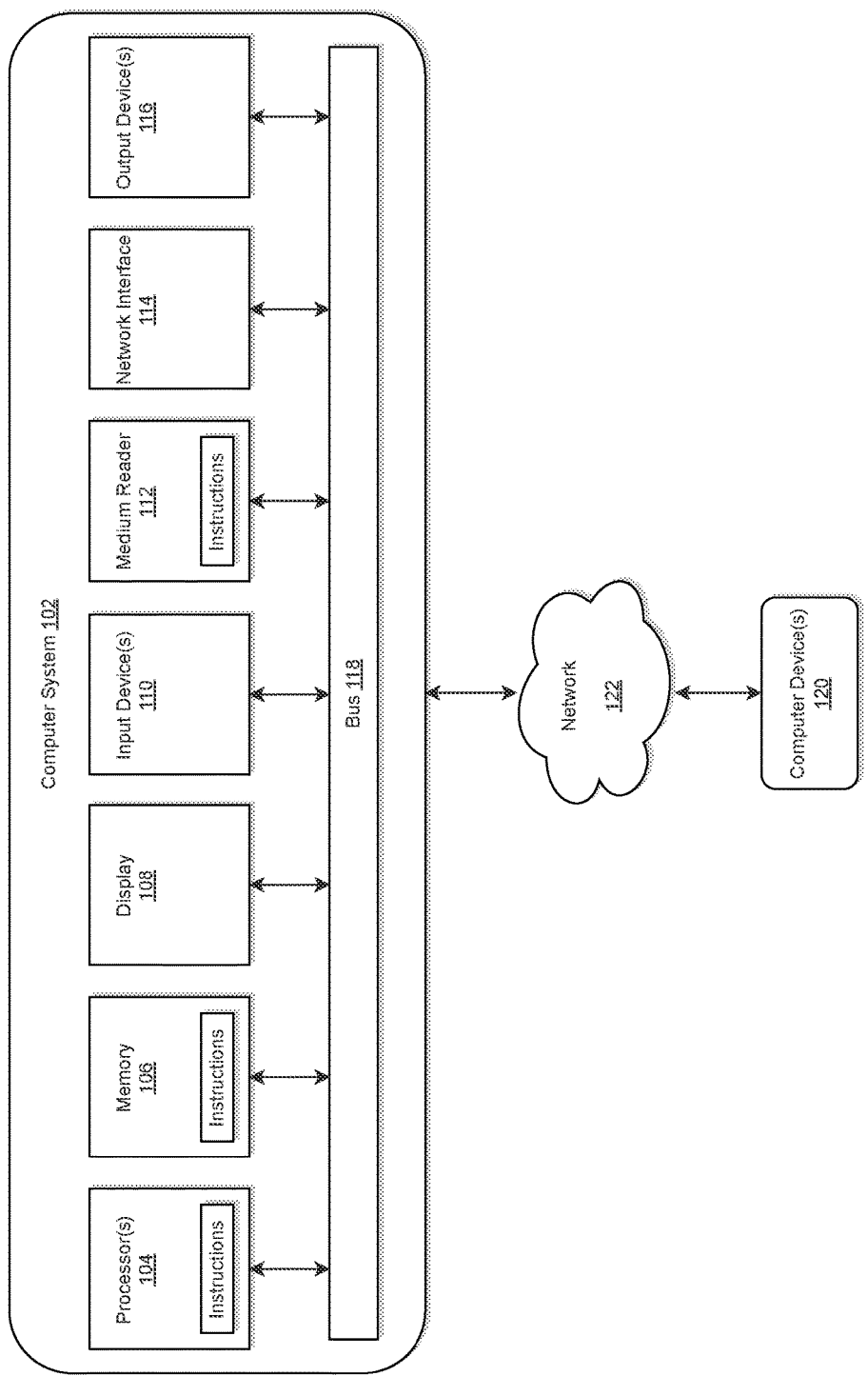
FIG. 1 illustrates a computer system for implementing a platform and language agnostic password-less authentication module configured to utilize a DDL of a user to allow access to an application in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a platform and language agnostic password-less authentication module configured to utilize a DDL of a user to allow access to an application in accordance with the embodiments described herein, but the disclosure is not limited thereto. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
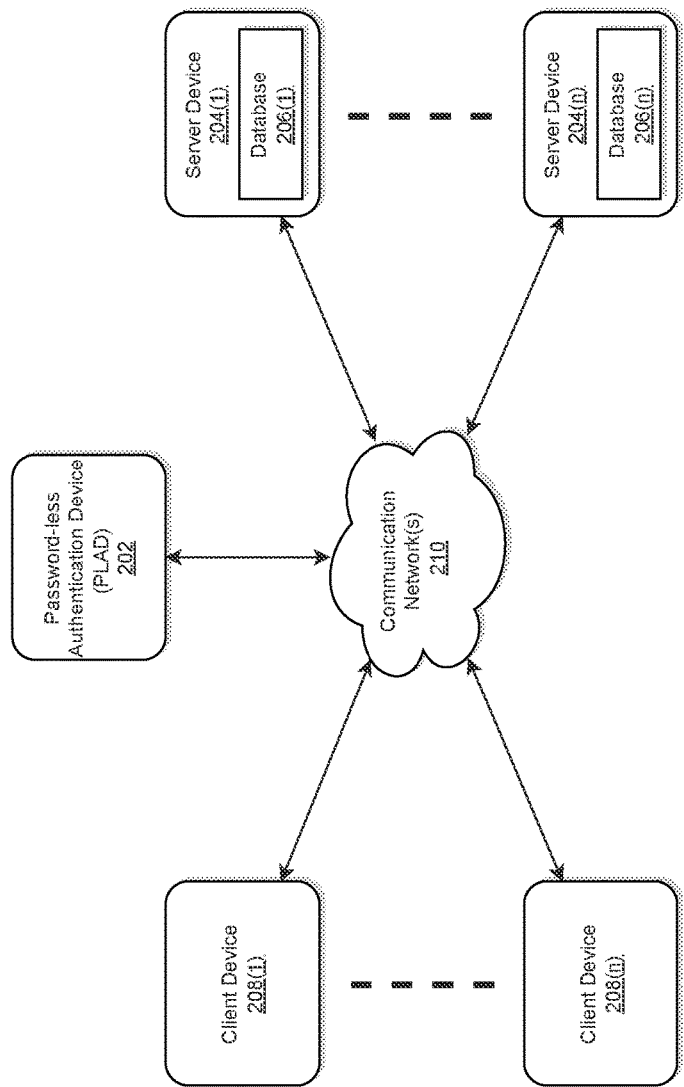
FIG. 2 illustrates an exemplary diagram of a network environment with a platform and language agnostic password-less authentication device in accordance with an exemplary embodiment.

Referring to FIG. 2, a schematic of an exemplary network environment 200 for implementing a platform and language agnostic password-less authentication device (PLAD) of the instant disclosure is illustrated.

According to exemplary embodiments, the above-described problems associated with conventional tools may be overcome by implementing a PLAD 202 as illustrated in FIG. 2 that may implement a platform and language agnostic password-less authentication module configured to utilize digital identification information (i.e., digital driving license) of a user, instead of using any user's password/passcode, to authenticate the user to access the application, but the disclosure is not limited thereto. A digital driver's license is a secure version of the user's physical driver's license or ID card that can be stored on the computing device. Both iPhone and Android users can already store things like credit cards, plane tickets, hotel keys, and event tickets in digital wallets.

The PLAD 202 may be the same or similar to the computer system 102 as described with respect to FIG. 1.

The PLAD 202 may store one or more applications that can include executable instructions that, when executed by the PLAD 202, cause the PLAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PLAD 202 itself, may be located in virtual server(s) running in a cloud-based computing environment rather than being tied to one or more specific physical network computing devices.

Also, the application(s) may be running in one or more virtual machines (VMs) executing on the PLAD 202. Additionally, in one or more embodiments of this technology, virtual machine(s) running on the PLAD 202 may be managed or supervised by a hypervisor.

In the network environment 200 of FIG. 2, the PLAD 202 is coupled to a plurality of server devices 204(1)-204(n) that hosts a plurality of databases 206(1)-206(n), and also to a plurality of client devices 208(1)-208(n) via communication network(s) 210. A communication interface of the PLAD 202, such as the network interface 114 of the computer system 102 of FIG. 1, operatively couples and communicates between the PLAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PLAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PLAD 202 may be a standalone device or integrated with one or more other devices or apparatuses, such as one or more of the server devices 204(1)-204(n), for example. In one particular example, the PLAD 202 may be hosted by one of the server devices 204(1)-204(n), and other arrangements are also possible. Moreover, one or more of the devices of the PLAD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PLAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the PLAD 202 as illustrated in FIG. 2 that may implement a platform and language agnostic password-less authentication module configured to utilize digital identification information (i.e., digital driving license) of a user, instead of using any user's password/passcode, to authenticate the user to access the application, but the disclosure is not limited thereto.

The client devices 208(1)-208(n) may run interface applications, such as standard web browsers or standalone client applications, which may provide an interface to communicate with the PLAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the PLAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PLAD 202, the server devices 204(1)-204(n), or the client devices 208(1)-208(n), for example, may be configured to operate as virtual instances on the same physical machine. For example, one or more of the PLAD 202, the server devices 204(1)-204(n), or the client devices 208(1)-208(n) may operate on the same physical device rather than as separate devices communicating through communication network(s) 210. Additionally, there may be more or fewer PLADs 202, server devices 204(1)-204(n), or client devices 208(1)-208(n) than illustrated in FIG. 2. According to exemplary embodiments, the PLAD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
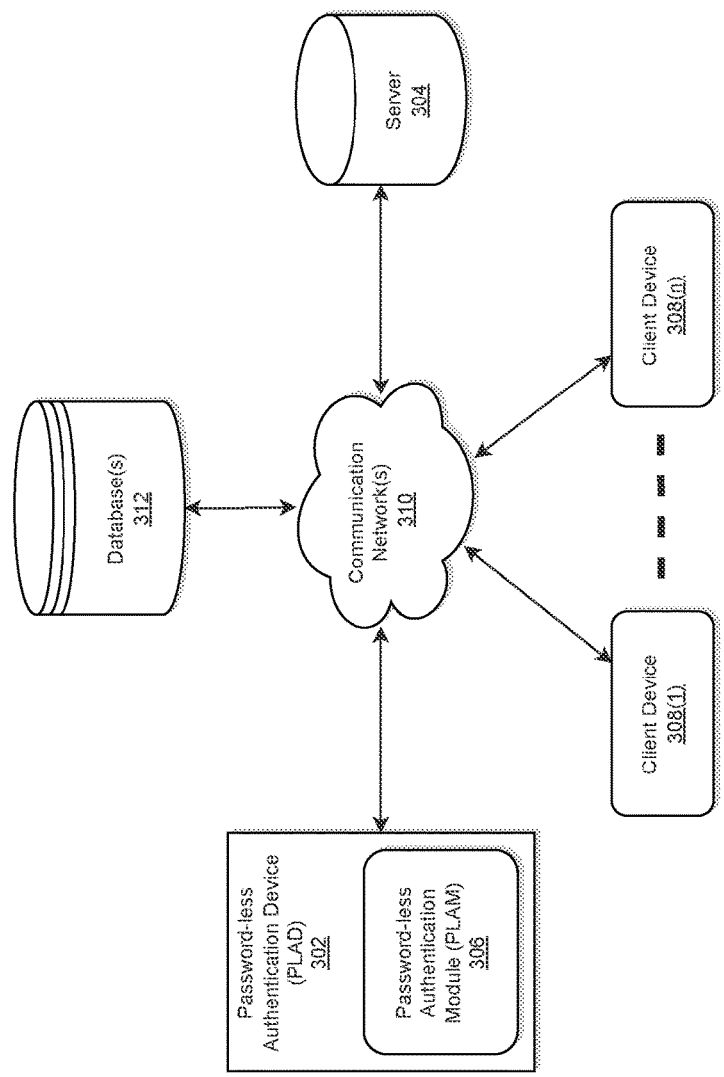
FIG. 3 illustrates a system diagram for implementing a platform and language agnostic password-less authentication device having a platform and language agnostic password-less authentication module in accordance with an exemplary embodiment.

FIG. 3 illustrates a system diagram for implementing a platform and language agnostic PLAD having a platform and language agnostic password-less authentication module (PLAM) in accordance with an exemplary embodiment.

As illustrated in FIG. 3, the system 300 may include a PLAD 302 within which an PLAM 306 is embedded, a server 304, a database(s) 312, a plurality of client devices 308(1) . . . 308(n), and a communication network 310. The database(s) 312 may be also referred to as a configuration and log database; and external or internal database, etc.

According to exemplary embodiments, the PLAD 302 including the PLAM 306 may be connected to the server 304, and the database(s) 312 via the communication network 310. The PLAD 302 may also be connected to the plurality of client devices 308(1) . . . 308(n) via the communication network 310, but the disclosure is not limited thereto. The client devices 308(1) . . . 308(n) may be the same or similar to the client devices 208(1) . . . 208(n)

According to exemplary embodiment, the PLAD 302 is described and shown in FIG. 3 as including the PLAM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein.

According to exemplary embodiments, the PLAM 306 may be configured to receive real-time feed of data from the plurality of client devices 308(1) . . . 308(n) via the communication network 310.

As will be described below, the PLAM 306 may be configured to store DDL information data of a user onto a computing device utilized by the user; receive user input via selection of an icon among a plurality of icons displayed on a user interface of the computing device, wherein the selected icon indicates registration option of the computing device via an external database that also stores the DDL information data of the user; extract, in response to receiving user input, the DDL information data from the computing device; call an application programming interface (API) associated with external database to extract the DDL information data of the user from the external database; compare the DDL information data of the user extracted from the computing device with the DDL information data of the user extracted from the external database; validate the DDL information data of the user extracted from the computing device when it is determined that the DDL information data of the user extracted from the computing device exactly matches the DDL information data of the user extracted from the external database; create, in response to validating, a DDL secret private key; store the DDL secret private key onto both an internal database and a secured environment within the computing device; transmit an electronic notification to the application that the registration of the computing device is successful; and display the electronic notification indicating successful registration onto the user interface, but the disclosure is not limited thereto.

The plurality of client devices 308(1) . . . 308(n) are illustrated as being in communication with the PLAD 302. In this regard, the plurality of client devices 308(1) . . . 308(n) may be "clients" of the PLAD 302 and are described herein as such. Nevertheless, it is to be known and understood that the plurality of client devices 308(1) . . . 308(n) need not necessarily be "clients" of the PLAD 302, or any entity described in association therewith herein. Any additional or alternative relationship may exist between either or both of the plurality of client devices 308(1) . . . 308(n) and the PLAD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the PLAD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The PLAD 302 may be the same or similar to the PLAD 202 as described with respect to FIG. 2, including any features or combination of features described with respect thereto.

Figure 4:
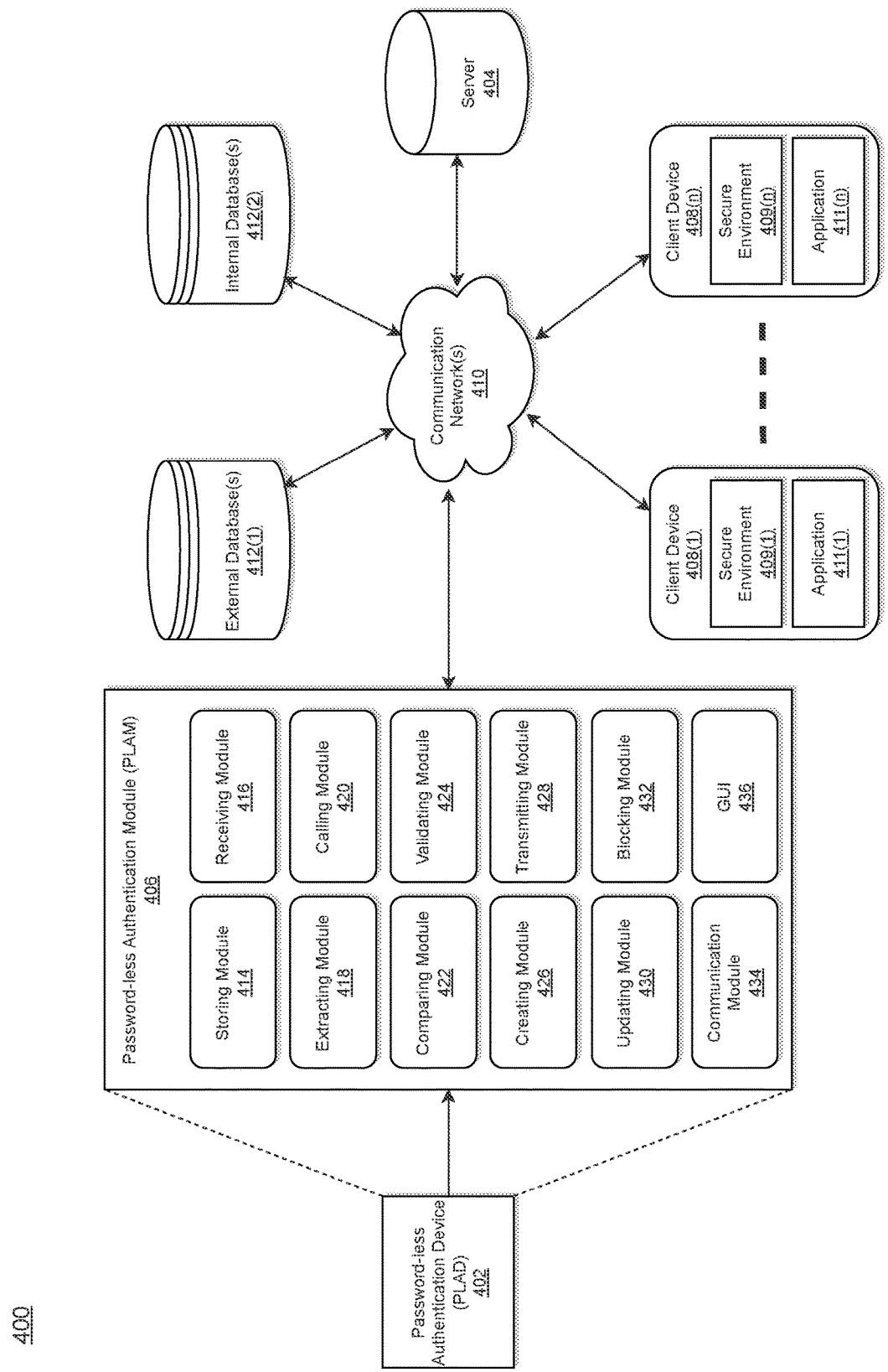
FIG. 4 illustrates a system diagram for implementing a platform and language agnostic password-less authentication module of FIG. 3 in accordance with an exemplary embodiment.

FIG. 4 illustrates a system diagram for implementing a platform and language agnostic PLAM of FIG. 3 in accordance with an exemplary embodiment.

According to exemplary embodiments, the system 400 may include a platform and language agnostic PLAD 402 within which a PLAM 406 is embedded, a server 404, external database(s) 412(1), internal database(s) 412(2), and a communication network 410.

According to exemplary embodiments, the PLAD 402 including the PLAM 406 may be connected to the server 404, the external database(s) 412(1), and internal database(s) 412(2) via the communication network 410. The PLAD 402 may also be connected to the plurality of client devices 408(1)-408(n) via the communication network 410, but the disclosure is not limited thereto. According to exemplary embodiments, each of the client device 408(1)-408(n) may include a secure environment 409(1) and an application 411(1) embedded therein. The PLAM 406, the server 404, the plurality of client devices 408(1)-408(n), the database(s) (i.e., 412(1) and 412(2)), the communication network 410 as illustrated in FIG. 4 may be the same or similar to the PLAM 306, the server 304, the plurality of client devices 308(1)-

308(n), the database(s) 312, the communication network 310, respectively, as illustrated in FIG. 3.

According to exemplary embodiments, as illustrated in FIG. 4, the PLAM 406 may include storing module 414, a receiving module 416, an extracting module 418, a calling module 420, a comparing module 422, a validating module 424, a creating module 426, a transmitting module 428, an updating module 430, a blocking module 432, a communication module 434, and a GUI 436.

According to exemplary embodiments, each of the storing module 414, receiving module 416, extracting module 418, calling module 420, comparing module 422, validating module 424, creating module 426, transmitting module 428, updating module 430, blocking module 432, and the communication module 434 of the PLAM 406 as illustrated in FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the storing module 414, receiving module 416, extracting module 418, calling module 420, comparing module 422, validating module 424, creating module 426, transmitting module 428, updating module 430, blocking module 432, and the communication module 434 of the PLAM 406 as illustrated in FIG. 4 may be implemented by microprocessors or similar, and may be programmed using software (e.g., microcode) to perform various functions discussed herein and may optionally be driven by firmware and/or software.

Alternatively, according to exemplary embodiments, each of the storing module 414, receiving module 416, extracting module 418, calling module 420, comparing module 422, validating module 424, creating module 426, transmitting module 428, updating module 430, blocking module 432, and the communication module 434 of the PLAM 406 as illustrated in FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the storing module 414, receiving module 416, extracting module 418, calling module 420, comparing module 422, validating module 424, creating module 426, transmitting module 428, updating module 430, blocking module 432, and the communication module 434 of the PLAM 406 as illustrated in FIG. 4 may be called via corresponding API.

The process may be executed via the communication module 434 and the communication network 410, which may comprise plural networks as described above. For example, in an exemplary embodiment, the various components of the PLAM 406 may communicate with the server 404, the external database(s) 412(1), and the internal database(s) 412(2) via the communication module 434 and the communication network 410. Of course, these embodiments are merely exemplary and are not limiting or exhaustive.

According to exemplary embodiments, the communication network 410 and the communication module 434 may be configured to establish a link among the external database(s) 412(1), internal database(s) 412(2), the client devices 408(1)-408(n) and the PLAM 406.

According to exemplary embodiments, the PLAM 406 may initially execute a process to register a computing device (i.e., client device 408(1)) with DDL capabilities by using the external database(s) 412(1) (i.e., a department of motor vehicle (DMV) of a state where the user resides) that stores and provide support for DDL verification of a user. DDL is a secure version of a user's physical driver's license or ID card that can be stored onto the computing device (i.e., client device 408(1)).

Although the example is given using DDL information, the disclosure is not limited thereto. For example, both iPhone an Android users can already store things like credit cards, plane tickets, hotel keys, and event tickets in digital wallets. Information from physical documents such as driver licenses, insurance policies, and vehicle registrations are often retrieved to verify the identity of an individual driving a vehicle and retrieve pertinent information related to the vehicle.

According to exemplary embodiments, a digital wallet application may be executed on the computing device (i.e., client device 408(1)-408(n)). The client device 408(1)-408(n) may be, for example, a mobile device (such as a smart phone, a tablet, a notebook, personal digital assistant, a dedicated wallet device, a wearable computing device, or any other portable device capable of sending and receiving messages over a network). The client device 408(1)-408(n) may also be devices integrated into the Internet of Things, such as a smart home or devices within the home. Within the digital wallet is information about different available digital identification documents of a user. In this example, the digital wallet has a driver's license of the user, but the disclosure is not limited thereto. For example, the digital wallet may include a military ID, a student ID, and a passport of the user. Other types of identification and permits can also be stored in the digital wallet, including but not limited to firearm permits, hunting licenses, medical licenses, bar admission cards, and a Naturalization and Immigration Services (NIS) Cards. According to exemplary embodiments, the digital wallet may only display information about digital identification documents to which the application 411(1)-411(n) has access.

According to exemplary embodiments, the storing module 414 may be configured to store DDL information data (i.e., photo of the user face) of a user onto a computing device (i.e., one of client device 408(1)-408(n)) utilized by the user. The receiving module 416 may be configured to receive user input via selection of an icon among a plurality of icons displayed on a user interface (i.e., GUI 436) of the computing device (i.e., one of client device 408(1)-408(n)). The selected icon may indicate registration option of the computing device (i.e., one of client device 408(1)-408(n)) via the external database 412(1) that also stores the DDL information data of the user.

According to exemplary embodiments, the extracting module 418 may be configured to extract, in response to receiving user input, the DDL information data from the computing device (i.e., one of client device 408(1)-408(n)).

According to exemplary embodiments, the calling module 420 may be configured to call an API associated with external database 412(1) to extract the DDL information data of the user from the external database 412(1). The comparing module 422 may be configured to compare the DDL information data of the user extracted from the computing device (i.e., one of client device 408(1)-408(n)) with the DDL information data of the user extracted from the external database 412(1). The validating module 424 may be configured to validate the DDL information data of the user extracted from the computing device (i.e., one of client device 408(1)-408(n)) when it is determined that the DDL information data of the user extracted from the computing device (i.e., one of client device 408(1)-408(n)) exactly matches the DDL information data of the user extracted from the external database 412(1).

According to exemplary embodiments, the creating module 426 may be configured to create, in response to validating by the validating module 424, a DDL secret private key. The storing module 414 then stores the DDL secret private key onto both the internal database 412(2) and a secured environment 409(1) within the computing device (i.e., one of client device 408(1)-408(n)). The transmitting module 426 may be configured to transmit an electronic notification to the application 411(1) that the registration of the computing device (i.e., one of client device 408(1)-408(n)) is successful; and display the electronic notification indicating successful registration onto the GUI 436.

According to exemplary embodiments, the validating module 424 may be configured to invalidate the DDL information data of the user extracted from the computing device (i.e., one of client device 408(1)-408(n)) when it is determined that the DDL information data of the user extracted from the computing device (i.e., one of client device 408(1)-408(n)) does not exactly match the DDL information data of the user extracted from the external database 412(1). The transmitting module 426 may be configured to transmit an electronic notification to the application 411(1) that the registration of the computing device (i.e., one of client device 408(1)-408(n)) is unsuccessful and display the electronic notification indicating unsuccessful registration onto the GUI 436.

According to exemplary embodiments, the computing device (i.e., one of client device 408(1)-408(n)) may be an android device, and the storing module 414 may be configured to store the DDL secret private key onto a trusted execution environment (i.e., secure environment 409(1)) within the android device.

According to exemplary embodiments, the computing device (i.e., one of client device 408(1)-408(n)) may be an iPhone, and the storing module 414 may be configured to store the DDL secret private key onto a secure enclave (i.e., secure environment 409(1)) within the iPhone.

According to exemplary embodiments, the external database 412(1) may be owned and operated by a third party vendor that utilizes external network that does not control operations of the application 411(1)-411(n), but the disclosure is not limited thereto.

According exemplary embodiments, the external database 412(1) may be owned and operated by a department of motor vehicle (DMV) of a state where the user resides, but the disclosure is not limited thereto.

According to exemplary embodiments, the internal database 412(2) may utilize internal network within an organization that controls operations of the application 411(1)-411(n).

According to exemplary embodiments, the receiving module 416 may be configured to receive a login request from the user, via the GUI 436, to login onto one of the application 411(1)-411(n). Hereinafter, application 411(1) will be utilized to describe the process.

According to exemplary embodiments, when it is determined that the registration of the computing device (i.e., one of client device 408(1)-408(n)) is successful utilizing the processes described above, the PLAM 406 may automatically execute the following login process in response to the login request.

For example, the extracting module 418 may be configured to extract the DDL secret private key from the computing device (i.e., one of client device 408(1)-408(n)) of the user and extract the DDL secret private key associated with the user from the internal database 412(2). The validating module 424 may be configured to validate the DDL secret private key extracted from the computing device (i.e., one of client device 408(1)-408(n)) when it is determined that the DDL secret private key extracted from the computing device (i.e., one of client device 408(1)-408(n)) exactly matches the DDL secret private key extracted from the internal database 412(2); and allow login access to the application 411(1) in response to validating the DDL secret private key.

According to exemplary embodiments, the creating module 426 may be configured to create a new DDL secret private key to be utilized for subsequent login request by the user. The updating module 430 may be configured to update the internal database 412(2) by replacing the DDL secret private key with the new DDL secret private key and replace the DDL secret private key stored onto the secured environment 409(1) of the computing device (i.e., client device 408(1)) with the new DDL secret private key. The PLAM 406 may then iterate the login process with the new DDL secret private key in response to receiving a subsequent request of login from the user.

According to exemplary embodiments, the validating module 424 may be configured to invalidate the DDL secret private key when it is determined that the DDL secret private key extracted from the computing device (i.e., client device 408(1)) does not exactly match the DDL secret private key extracted from the internal database 412(2). The blocking module 432 may be configured to block login access to the application 411(1) in response to invalidating the DDL secret private key and lock user's account associated with the application 411(1). The transmitting module 428 may be configured to transmit an electronic notification to the application 411(1) indicating that the user's account has been locked. The electronic notification indicating locked user's account is then displayed onto the GUI.

Figure 5:
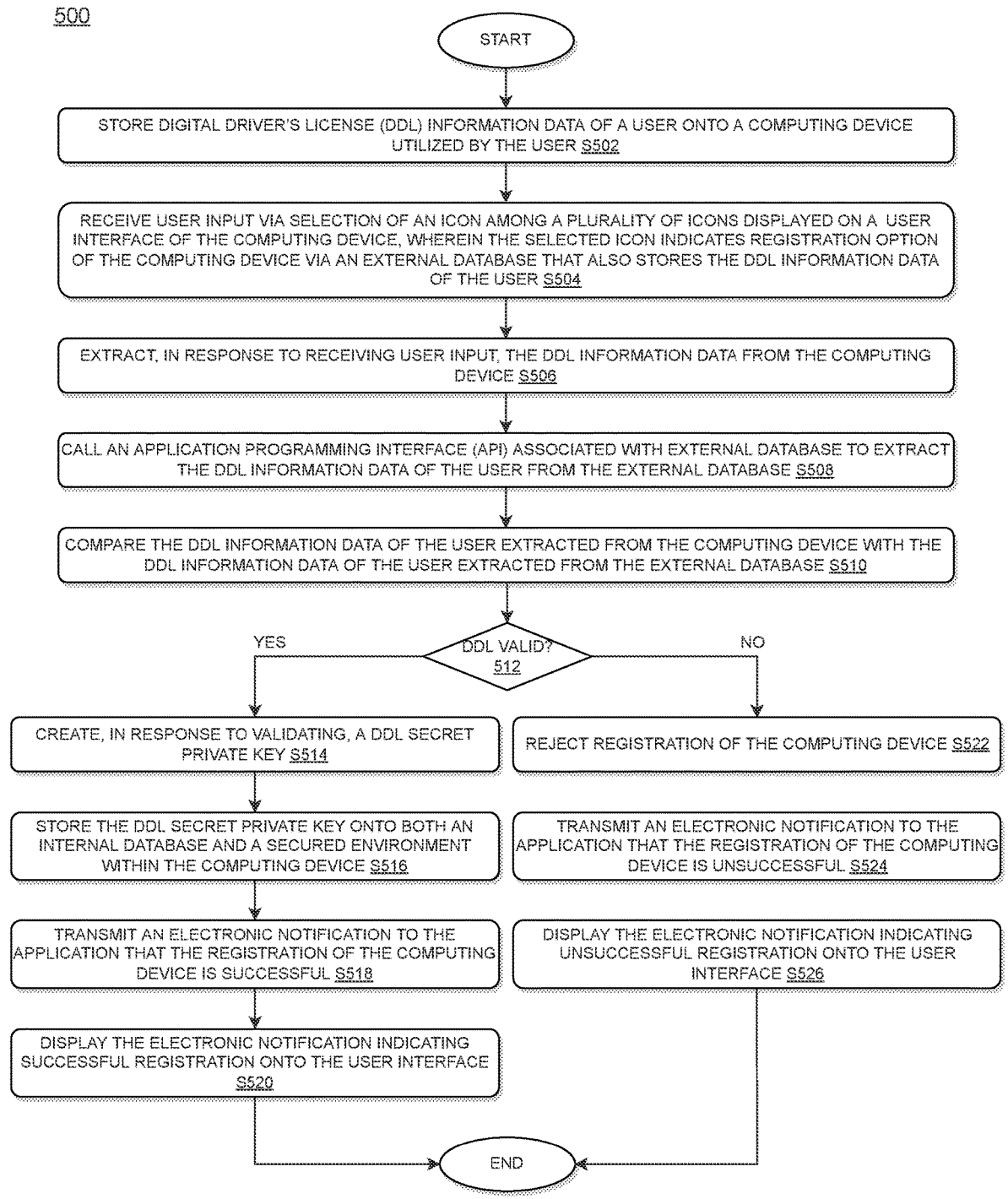
FIG. 5 illustrates an exemplary flow chart of user's computing device registration implemented by the platform and language agnostic password-less authentication module of FIG. 4 in accordance with an exemplary embodiment.

FIG. 5 illustrates a flow chart of a process 500 of user's computing device (i.e., client device 408(1)) registration processes disclosed above as implemented by the PLAM 405 of FIG. 4 in accordance with an exemplary embodiment. It will be appreciated that the illustrated process 500 and associated steps may be performed in a different order, with illustrated steps omitted, with additional steps added, or with a combination of reordered, combined, omitted, or additional steps.

As illustrated in FIG. 5, at step S502, the process 500 may include storing digital driver's license (DDL) information data of a user onto a computing device utilized by the user.

At step S504, the process 500 may include receiving user input via selection of an icon among a plurality of icons displayed on a user interface of the computing device, wherein the selected icon indicates registration option of the computing device via an external database that also stores the DDL information data of the user.

At step S506, the process 500 may include extracting, in response to receiving user input, the DDL information data from the computing device.

At step S508, the process 500 may include calling an application programming interface (API) associated with external database to extract the DDL information data of the user from the external database.

At step S510, the process 500 may include comparing the DDL information data of the user extracted from the computing device with the DDL information data of the user extracted from the external database.

At step 512, the process 500 may determine whether the DDL is valid or not. For example, the process 500 may include validating the DDL information data of the user extracted from the computing device when it is determined that the DDL information data of the user extracted from the computing device exactly matches the DDL information data of the user extracted from the external database.

When it is determined at step 512 that the DDL is valid, at step S514, the process 500 may include creating, in response to validating, a DDL secret private key; at step S516, the process 500 may include storing the DDL secret private key onto both an internal database and a secured environment within the computing device; at step S518, the process 500 may include transmitting an electronic notification to the application that the registration of the computing device is successful; and at step S514, the process 500 may include displaying the electronic notification indicating successful registration onto the user interface.

According to exemplary embodiments, at step 512 the process 500 may include invalidating the DDL information data of the user extracted from the computing device when it is determined that the DDL information data of the user extracted from the computing device does not exactly match the DDL information data of the user extracted from the external database.

When it is determined at step 512 that the DDL is invalid, at step S522, the process 500 may include rejecting registration of the computing device; at step S524, the process 500 may include transmitting an electronic notification to the application that the registration of the computing device is unsuccessful; and at step S526, the process 500 may include displaying the electronic notification indicating unsuccessful registration onto the user interface.

Figure 6:
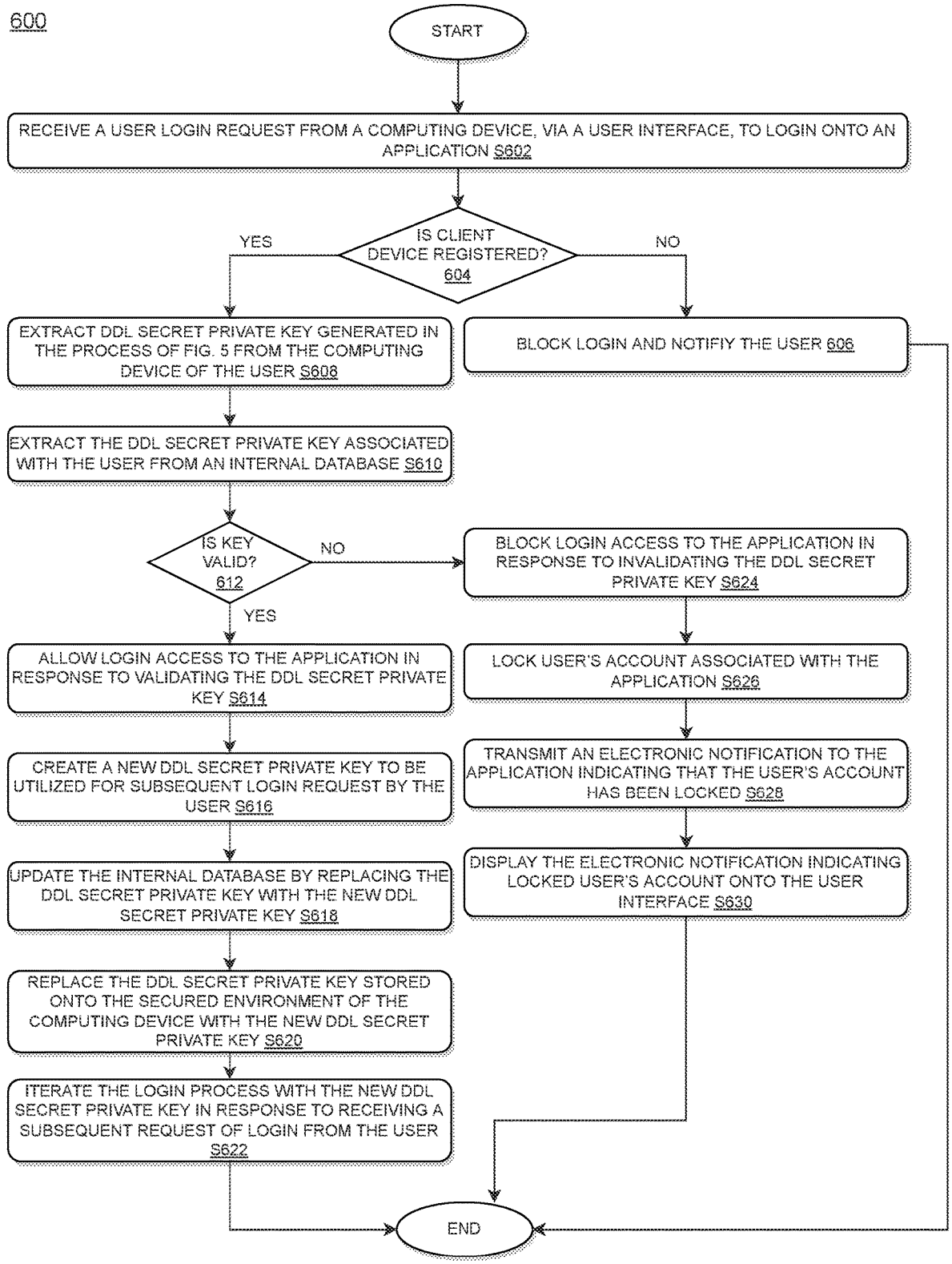
FIG. 6 illustrates an exemplary flow chart of user's login implemented by the platform and language agnostic password-less authentication module of FIG. 4 in accordance with an exemplary embodiment.

FIG. 6 illustrates an exemplary flow chart 600 of user's login implemented by the PLAM 406 of FIG. 4 in accordance with an exemplary embodiment. It will be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include receiving a login request from the user, via the user interface, to login onto the application.

At step S604, the process 600 may determine whether the client device is registered via the registration process as disclosed herein with FIG. 5.

For example, when at step 604 it is determined that the client device has failed successful registration process as disclosed herein with reference to FIG. 5, at step S606 the process 600 may include blocking login and notifying the user.

However, when at step 604 it is determined that the client device has undergone a successful registration process as disclosed herein with reference to FIG. 5, at step S608 the process 600 may include extracting the DDL secret private key from the computing device of the user; and at step 610 the process 600 may include extracting the DDL secret private key associated with the user from the internal database.

At step 612, the process 600 may determine whether the DDL secret private key is valid or not.

For example, at step S614, the process 600 may include validating the DDL secret private key extracted from the computing device when it is determined at step 612 that the DDL secret private key extracted from the computing device exactly matches the DDL secret private key extracted from the internal database and allowing login access to the application in response to validation the DDL secret private key. In response to positive validation results, the process 600 may execute the following steps: at step S616, the process 600 may include creating a new DDL secret private key to be utilized for subsequent login request by the user; at step S618, the process 600 may include updating the internal database by replacing the DDL secret private key with the new DDL secret private key; at step S620, the process 600 may include replacing the DDL secret private key stored onto the secured environment of the computing device with the new DDL secret private key; and at step S620, the process 600 may include iterating the login process with the new DDL secret private key in response to receiving a subsequent request of login from the user.

At step S624, the process 600 may include invalidating the DDL secret private key extracted from the computing device when it is determined at step 612 that the DDL secret private key extracted from the computing device does not exactly match the DDL secret private key extracted from the internal database and blocking login access to the application in response to invalidation the DDL secret private key. In response to negative validation results, the process 600 may execute the following steps: at step S624, the process 600 may include blocking login access to the application in response to invalidating the DDL secret private key; at step S626, the process 600 may include locking user's account associated with the application; at step S628, the process 600 may include transmitting an electronic notification to the application indicating that the user's account has been locked; and at step S630, the process 600 may include displaying the electronic notification indicating locked user's account onto the user interface.

According to exemplary embodiments, the PLAD 402 may include a memory (e.g., a memory 106 as illustrated in FIG. 1) which may be a non-transitory computer readable medium that may be configured to store instructions for implementing the PLAM 406 for password-less authentication and login onto an application as disclosed herein. The PLAD 402 may also include a medium reader (e.g., a medium reader 112 as illustrated in FIG. 1) which may be configured to read any one or more sets of instructions, e.g., software, from any of the memories described herein. The instructions, when executed by a processor embedded within the PLAM 406, or within the PLAD 402, may be used to perform one or more of the methods and processes as described herein. In a particular embodiment, the instructions may reside completely, or at least partially, within the memory 106, the medium reader 112, and/or the processor 104 (see FIG. 1) during execution by the PLAD 402.

According to exemplary embodiments, the instructions, when executed, may cause a processor 104 embedded within the PLAM 406 or the PLAD 402 to perform the following: storing digital driver's license (DDL) information data of a user onto a computing device utilized by the user; receiving user input via selection of an icon among a plurality of icons displayed on a user interface of the computing device, wherein the selected icon indicates registration option of the computing device via an external database that also stores the DDL information data of the user; extracting, in response to receiving user input, the DDL information data from the computing device; calling an application programming interface (API) associated with external database to extract the DDL information data of the user from the external database; comparing the DDL information data of the user extracted from the computing device with the DDL information data of the user extracted from the external database; validating the DDL information data of the user extracted from the computing device when it is determined that the DDL information data of the user extracted from the computing device exactly matches the DDL information data of the user extracted from the external database; creating, in response to validating, a DDL secret private key; storing the DDL secret private key onto both an internal database and a secured environment within the computing device; transmitting an electronic notification to the application that the registration of the computing device is successful; and displaying the electronic notification indicating successful registration onto the user interface.

According to exemplary embodiments, the instructions, when executed, may cause the processor 104 to perform the following: invalidating the DDL information data of the user extracted from the computing device when it is determined that the DDL information data of the user extracted from the computing device does not exactly match the DDL information data of the user extracted from the external database; transmitting an electronic notification to the application that the registration of the computing device is unsuccessful; and displaying the electronic notification indicating unsuccessful registration onto the user interface.

According to exemplary embodiments, the instructions, when executed, may cause the processor 104 to perform the following: receiving a login request from the user, via the user interface, to login onto the application; and when it is determined that the registration of the computing device is successful based on the registration process disclosed above, the method may further automatically execute the following login process in response to the login request: extracting the DDL secret private key from the computing device of the user; extracting the DDL secret private key associated with the user from the internal database; validating the DDL secret private key extracted from the computing device when it is determined that the DDL secret private key extracted from the computing device exactly matches the DDL secret private key extracted from the internal database; and allowing login access to the application in response to validating the DDL secret private key.

According to exemplary embodiments, the instructions, when executed, may cause the processor 104 to perform the following: creating a new DDL secret private key to be utilized for subsequent login request by the user; updating the internal database by replacing the DDL secret private key with the new DDL secret private key; replacing the DDL secret private key stored onto the secured environment of the computing device with the new DDL secret private key; and iterating the login process with the new DDL secret private key in response to receiving a subsequent request of login from the user.

According to exemplary embodiments, the instructions, when executed, may cause the processor 104 to perform the following: invalidating the DDL secret private key when it is determined that the DDL secret private key extracted from the computing device does not exactly match the DDL secret private key extracted from the internal database; blocking login access to the application in response to invalidating the DDL secret private key; locking user's account associated with the application; transmitting an electronic notification to the application indicating that the user's account has been locked; and displaying the electronic notification indicating locked user's account onto the user interface.

According to exemplary embodiments as disclosed above in FIGS. 1-6, technical improvements effected by the instant disclosure may include a platform for implementing a platform and language agnostic password-less authentication module configured to utilize digital identification information (i.e., digital driving license) of a user, instead of using any user's password/passcode, to authenticate the user to access the application, but the disclosure is not limited thereto.

For example, according to exemplary embodiments as disclosed above in FIGS. 1-6, technical improvements effected by the PLAM 406 of the instant disclosure may allow: seamless transition (during onboarding of a user into an organization) from account opening into digital profile creation and password-less enrollment by generating secret private key from a user who is applying with a DDL enabled, then leveraging the secret private key when they download/enroll the application. Separate from this experience, the PLAM 406 may be configured to use a DDL to prefill an application, and pass identity and fraud screening hurdles at account origination—this would create an almost frictionless journey from onboarding to active user status.

In addition, according to exemplary embodiments as disclosed above in FIGS. 1-6, technical improvements effected by the PLAM 406 of the instant disclosure may allow existing users who may not have password-less enrollment previously, enabling DDL to facilitate the enrollment allowing the internal verification behind the scenes and taking the work out of the user's hands. The PLAM 406 is configured to "look up" the right profiles to enroll by extracting data from the DDL, and verify the user by trusting the DDL.

According to exemplary embodiments as disclosed above in FIGS. 1-6, technical improvements effected by the PLAM 406 of the instant disclosure may allow enhanced security. For example, an identity-proofed, password-less user would have significantly reduced 1st party and 3rd party fraud risk, and by tying these processes together the PLAM 406 is configured to reduce risk of fraud and fast-path those users who opt in to this security. DDL enrollment may be managed by state DMVs and requires extensive, heavy weight identity proofing events that require a physical document scan with selfie comparison, and correlation of data to state systems of record. That dramatically reduces identity theft risk and may reduce 1st party and synthetic fraud risk. Also, a password-less enrollment binds a user securely to their device, and as long as they transact from that device we have significantly reduced account take over risk.

According to exemplary embodiments as disclosed above in FIGS. 1-6, technical improvements effected by the PLAM 406 of the instant disclosure may allow enhanced login experience. For example, any password-less user will have a low friction login experience, but by tying the enrollment to the DDL, the PLAM 406 can help solve for difficult edge use cases. For example, a user who is enrolled through this method could "reassert" their identity in the event of an account take over. Moreover, the PLAM 406 can be configured to tie multiple customer relationships to a single DDL enrollment, enabling password-less access tied to identity proofing for a user across multiple relationships.

DDLs are an uncharted territory. Often it is not known what permissions, data management, accesses, etc. might impact the environment. While DDLs follow common protocols for enrollment and access, the market is fragmented both by issuers (State DMVs) and handset providers (Apple, Android). Taking the level of trust and verification associated with a DDL and translating it to an internal secret private key generated by the PLAM 406 may insulate internal networks from those issues by transferring the trust of the DDL to the internal network.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure.

Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for password-less authentication and login onto an application by utilizing one or more processors and one or more memories, the method comprising:
    storing digital driver's license (DDL) information data of a user onto a computing device utilized by the user;
    receiving user input via selection of an icon among a plurality of icons displayed on a user interface of the computing device, wherein the selected icon indicates registration option of the computing device via an external database that also stores the DDL information data of the user;
    extracting, in response to receiving user input, the DDL information data from the computing device;
    calling an application programming interface (API) associated with external database to extract the DDL information data of the user from the external database;
    comparing the DDL information data of the user extracted from the computing device with the DDL information data of the user extracted from the external database;

validating the DDL information data of the user extracted from the computing device when it is determined that the DDL information data of the user extracted from the computing device exactly matches the DDL information data of the user extracted from the external database;

creating, in response to validating, a DDL secret private key;

storing the DDL secret private key onto both an internal database and a secured environment within the computing device;

transmitting an electronic notification to the application that the registration of the computing device is successful;

displaying the electronic notification indicating successful registration onto the user interface;

receiving a login request from the user, via the user interface, to login onto the application; and when it is determined that the registration of the computing device is successful, automatically executing the following login process in response to the login request:

extracting the DDL secret private key from the computing device of the user;

extracting the DDL secret private key associated with the user from the internal database;

validating the DDL secret private key extracted from the computing device when it is determined that the DDL secret private key extracted from the computing device exactly matches the DDL secret private key extracted from the internal database; and allowing login access to the application in response to validating the DDL secret private key.

2. The method according to claim 1, further comprising:
invalidating the DDL information data of the user extracted from the computing device when it is determined that the DDL information data of the user extracted from the computing device does not exactly match the DDL information data of the user extracted from the external database;
transmitting an electronic notification to the application that the registration of the computing device is unsuccessful; and
displaying the electronic notification indicating unsuccessful registration onto the user interface.

3. The method according to claim 1, wherein the computing device is a mobile device and the application is a mobile application configured to support conducting online transaction.

4. The method according to claim 3, wherein the mobile device is an android device, and the method further comprising:
storing the DDL secret private key onto a trusted execution environment within the android device.

5. The method according to claim 3, wherein the mobile device is an iPhone, and the method further comprising:
storing the DDL secret private key onto a secure enclave within the iPhone.

6. The method according to claim 1, wherein the external database is owned and operated by a third party vendor that utilizes external network that does not control operations of the application.

7. The method according to claim 6, wherein the external database is owned and operated by a department of motor vehicle (DMV) of a state where the user resides.

8. The method according to claim 1, wherein the internal database utilizes internal network within an organization that controls operations of the application.

9. The method according to claim 1, further comprising:
creating a new DDL secret private key to be utilized for subsequent login request by the user.

10. The method according to claim 9, further comprising:
updating the internal database by replacing the DDL secret private key with the new DDL secret private key;
replacing the DDL secret private key stored onto the secured environment of the computing device with the new DDL secret private key; and
iterating the login process with the new DDL secret private key in response to receiving a subsequent request of login from the user.

11. The method according to claim 1, further comprising:
invalidating the DDL secret private key when it is determined that the DDL secret private key extracted from the computing device does not exactly match the DDL secret private key extracted from the internal database;
blocking login access to the application in response to invalidating the DDL secret private key;
locking user's account associated with the application;
transmitting an electronic notification to the application indicating that the user's account has been locked; and
displaying the electronic notification indicating locked user's account onto the user interface.

12. A system for password-less authentication and login onto an application, the system comprising:
a processor; and
a memory operatively connected to the processor via a communication interface, the memory storing computer readable instructions, when executed, causes the processor to:
store digital driver's license (DDL) information data of a user onto a computing device utilized by the user;
receive user input via selection of an icon among a plurality of icons displayed on a user interface of the computing device, wherein the selected icon indicates registration option of the computing device via an external database that also stores the DDL information data of the user;
extract, in response to receiving user input, the DDL information data from the computing device;
call an application programming interface (API) associated with external database to extract the DDL information data of the user from the external database;
compare the DDL information data of the user extracted from the computing device with the DDL information data of the user extracted from the external database;
validate the DDL information data of the user extracted from the computing device when it is determined that the DDL information data of the user extracted from the computing device exactly matches the DDL information data of the user extracted from the external database;
create, in response to validating, a DDL secret private key;
store the DDL secret private key onto both an internal database and a secured environment within the computing device;
transmit an electronic notification to the application that the registration of the computing device is successful;
display the electronic notification indicating successful registration onto the user interface;
receive a login request from the user, via the user interface, to login onto the application; and when it is determined that the registration of the computing device is successful, automatically execute the following login process in response to the login request:
   extract the DDL secret private key from the computing device of the user;
   extract the DDL secret private key associated with the user from the internal database;
   validate the DDL secret private key extracted from the computing device when it is determined that the DDL secret private key extracted from the computing device exactly matches the DDL secret private key extracted from the internal database; and
   allow login access to the application in response to validating the DDL secret private key.

13. The system according to claim 12, wherein the processor is further configured to:
   invalidate the DDL information data of the user extracted from the computing device when it is determined that the DDL information data of the user extracted from the computing device does not exactly match the DDL information data of the user extracted from the external database;
   transmit an electronic notification to the application that the registration of the computing device is unsuccessful; and
   display the electronic notification indicating unsuccessful registration onto the user interface.

14. The system according to claim 12, wherein the processor is further configured to:
   create a new DDL secret private key to be utilized for subsequent login request by the user;
   update the internal database by replacing the DDL secret private key with the new DDL secret private key;
   replace the DDL secret private key stored onto the secured environment of the computing device with the new DDL secret private key; and
   iterate the login process with the new DDL secret private key in response to receiving a subsequent request of login from the user.

15. A non-transitory computer readable medium configured to store instructions for password-less authentication and login onto an application, wherein, when executed, the instructions cause a processor to perform the following:
   storing digital driver's license (DDL) information data of a user onto a computing device utilized by the user;
   receiving user input via selection of an icon among a plurality of icons displayed on a user interface of the computing device, wherein the selected icon indicates registration option of the computing device via an external database that also stores the DDL information data of the user;
   extracting, in response to receiving user input, the DDL information data from the computing device;
   calling an application programming interface (API) associated with external database to extract the DDL information data of the user from the external database;
   comparing the DDL information data of the user extracted from the computing device with the DDL information data of the user extracted from the external database;
   validating the DDL information data of the user extracted from the computing device when it is determined that the DDL information data of the user extracted from the computing device exactly matches the DDL information data of the user extracted from the external database;
   creating, in response to validating, a DDL secret private key;
   storing the DDL secret private key onto both an internal database and a secured environment within the computing device;
   transmitting an electronic notification to the application that the registration of the computing device is successful;
   displaying the electronic notification indicating successful registration onto the user interface;
   receiving a login request from the user, via the user interface, to login onto the application; and
   when it is determined that the registration of the computing device is successful, automatically executing the following login process in response to the login request:
      extracting the DDL secret private key from the computing device of the user;
      extracting the DDL secret private key associated with the user from the internal database;
      validating the DDL secret private key extracted from the computing device when it is determined that the DDL secret private key extracted from the computing device exactly matches the DDL secret private key extracted from the internal database; and
      allowing login access to the application in response to validating the DDL secret private key.

16. The non-transitory computer readable medium according to claim 15, wherein, when executed, the instructions further cause the processor to perform the following:
   invalidating the DDL information data of the user extracted from the computing device when it is determined that the DDL information data of the user extracted from the computing device does not exactly match the DDL information data of the user extracted from the external database;
   transmitting an electronic notification to the application that the registration of the computing device is unsuccessful; and
   displaying the electronic notification indicating unsuccessful registration onto the user interface.

17. The non-transitory computer readable medium according to claim 15, wherein the instructions, when executed, further cause the processor to perform the following:
   creating a new DDL secret private key to be utilized for subsequent login request by the user;
   updating the internal database by replacing the DDL secret private key with the new DDL secret private key;
   replacing the DDL secret private key stored onto the secured environment of the computing device with the new DDL secret private key; and
   iterating the login process with the new DDL secret private key in response to receiving a subsequent request of login from the user.

* * * * *